US012755325B2

(12) United States Patent
Germain et al.

(10) Patent No.: US 12,755,325 B2

(45) Date of Patent: Oct. 6, 2026

(54) ASSISTED BUSINESS INTELLIGENCE ON PERFORMANCE OF COMPLEX ASSETS WITH TAXONOMY OF REAL TIME SYSTEMS

(71) Applicant: Halliburton Energy Services, Inc., Houston, TX (US)

(72) Inventors: Olivier Roger Germain, Houston, TX (US); Mahdi Parak, Houston, TX (US); Varun Tyagi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 256 days.

(21) Appl. No.: 17/553,217

(22) Filed: Dec. 16, 2021

(65) Prior Publication Data

US 2023/0196480 A1 Jun. 22, 2023

(51) Int. Cl.
*G06Q 50/02* (2024.01)
*G06Q 10/0639* (2023.01)

(52) U.S. Cl.
CPC ......... *G06Q 50/02* (2013.01); *G06Q 10/0639* (2013.01)

(58) Field of Classification Search
None
See application file for complete search history.

(56) References Cited

U.S. PATENT DOCUMENTS 9,424,577 B2 * 8/2016 Mutha .................. G06Q 20/326
2008/0082302 A1 * 4/2008 Samardzija .......... G05B 23/021 703/2

(Continued)

FOREIGN PATENT DOCUMENTS

WO WO-2008042739 A2 * 4/2008 ......... G05B 23/0267
WO WO-2009079570 A2 * 6/2009 ............. G06Q 10/06

(Continued)

OTHER PUBLICATIONS

Gooneratne, Chinthaka P., et al. "Drilling in the fourth industrial revolution—Vision and challenges." IEEE Engineering Management Review 48.4 (2020): 144-159. (Year: 2020).*

(Continued)

*Primary Examiner* — Brian M Epstein
*Assistant Examiner* — Derick J Holzmacher
(74) *Attorney, Agent, or Firm* — Michael Jenney; Parker Justiss, P.C.

(57) ABSTRACT

Introduced herein are techniques that can create descriptive taxonomies of expected data streams and identify and associate each incoming data stream with the taxonomies automatically. The introduced techniques can significantly reduce the human intervention and efforts and hence the number of human errors in identifying and mapping signals. The introduced techniques can also automatically store values of the data streams and their corresponding taxonomies as facts and dimensions in a business intelligence (BI) data repository/warehouse. Doing so, the techniques create a BI data repository with various sets of logically nested dimensions and facts that can be used to analyze performances of various assets in petroleum service environment. Leveraging their similar hierarchical structures and elements, the techniques can expand and combine taxonomies and allow an end user to, not only analyze performances of assets in a specific rig, but across multiple rigs and projects, which were not possible before.

20 Claims, 12 Drawing Sheets

(56) References Cited

U.S. PATENT DOCUMENTS

| | | | | |
|---|---|---|---|---|
| 2008/0125973 | A1* | 5/2008 | Sherwood | E21B 49/10 73/152.24 |
| 2010/0050017 | A1* | 2/2010 | Almadi | E21B 47/12 713/400 |
| 2010/0114899 | A1 | 5/2010 | Guha et al. | |
| 2013/0254416 | A1* | 9/2013 | Abraham | E21B 47/26 709/230 |
| 2014/0100819 | A1* | 4/2014 | Grable | G05B 23/0221 702/183 |
| 2014/0351642 | A1* | 11/2014 | Bates | G05B 23/0229 714/26 |
| 2016/0098037 | A1* | 4/2016 | Zornio | H04L 43/045 700/20 |
| 2016/0275133 | A1 | 9/2016 | Moore | |
| 2016/0349389 | A1 | 12/2016 | Walters et al. | |
| 2017/0102678 | A1* | 4/2017 | Nixon | G05B 17/02 |
| 2017/0102693 | A1* | 4/2017 | Kidd | G05B 19/41865 |
| 2017/0102694 | A1* | 4/2017 | Enver | G05B 19/4184 |
| 2017/0102696 | A1* | 4/2017 | Bell | G05B 23/0275 |
| 2017/0103103 | A1* | 4/2017 | Nixon | G06F 16/2452 |
| 2018/0284758 | A1* | 10/2018 | Cella | B62D 15/0215 |
| 2019/0003297 | A1* | 1/2019 | Brannigan | G06F 18/22 |
| 2019/0147125 | A1* | 5/2019 | Yu | E21B 44/00 703/10 |
| 2019/0278298 | A1* | 9/2019 | Pedersen | G05D 1/0287 |
| 2019/0339687 | A1* | 11/2019 | Cella | G05B 19/4185 |
| 2019/0347590 | A1* | 11/2019 | Rajasekaran | G06Q 10/0635 |
| 2020/0103889 | A1* | 4/2020 | Cella | H04L 67/12 |
| 2020/0103894 | A1* | 4/2020 | Cella | G01H 1/003 |
| 2020/0387818 | A1* | 12/2020 | Chan | G06Q 10/06395 |
| 2021/0148213 | A1* | 5/2021 | Madasu | E21B 49/003 |
| 2021/0180439 | A1* | 6/2021 | Rawlinson | G06N 5/01 |
| 2021/0233008 | A1* | 7/2021 | Gupta | G06Q 50/02 |
| 2021/0246766 | A1 | 8/2021 | Wilson | |
| 2021/0348490 | A1* | 11/2021 | Wheatley | E21B 47/02 |
| 2022/0195861 | A1* | 6/2022 | Patino Virano | G06Q 50/02 |
| 2022/0397029 | A1* | 12/2022 | Wicks | G06N 3/088 |

FOREIGN PATENT DOCUMENTS

| | | | | |
|---|---|---|---|---|
| WO | WO-2013095395 | A1 * | 6/2013 | G06F 16/2358 |
| WO | 2015171799 | A1 | 11/2015 | |

OTHER PUBLICATIONS

Almadani, Basem. "QoS-aware real-time pub/sub middleware for drilling data management in petroleum industry." Journal of Ambient Intelligence and Humanized Computing 7 (2016): 287-299. (Year: 2016).*

"Drilling Data Hub: Technical Description," Steering Committee, Jan. 19, 2018, 42 pages, IRIS.

"Basics of Modeling in Power BI: What is a Dimension Table and Why Say No to a Single Big Table," Radacad, May 6, 2019, 33 pages, https://radacad.com/basics-of-modeling-in-power-bi-what-is-a-dimension.

* cited by examiner

510

ASSISTED BUSINESS INTELLIGENCE ON PERFORMANCE OF COMPLEX ASSETS WITH TAXONOMY OF REAL TIME SYSTEMS

BACKGROUND

Modern drilling rigs or production platforms typically stream data from dozens or hundreds of sensors and IoT devices. This data can easily be viewed as logs, images, or sounds. Data scientists build artificial intelligence/machine learning models using historical data to be run against the same type of streams for prediction. Engineers need to analyze drilling or production performance using standard tools of the trade for business intelligence (BI).

A typical BI analysis involves comparing performance over time, or against plans, or against peers. The streaming data is considered as "fact", with many such facts streaming in parallel at various frequencies. Engineer needs to establish "dimensions" against which comparable facts can be evaluated. Creating such dimensions takes a lot of manual efforts and is prone to errors as most data streams are difficult to identify, differentiate or group. As such, an automated technique that can accurately identify and "dimension" data streams from various oil field service companies and create an environment that may be used for BI analysis by engineers is needed.

BRIEF DESCRIPTION

Reference is now made to the following descriptions taken in conjunction with the accompanying drawings, in which.

Figure 5A:
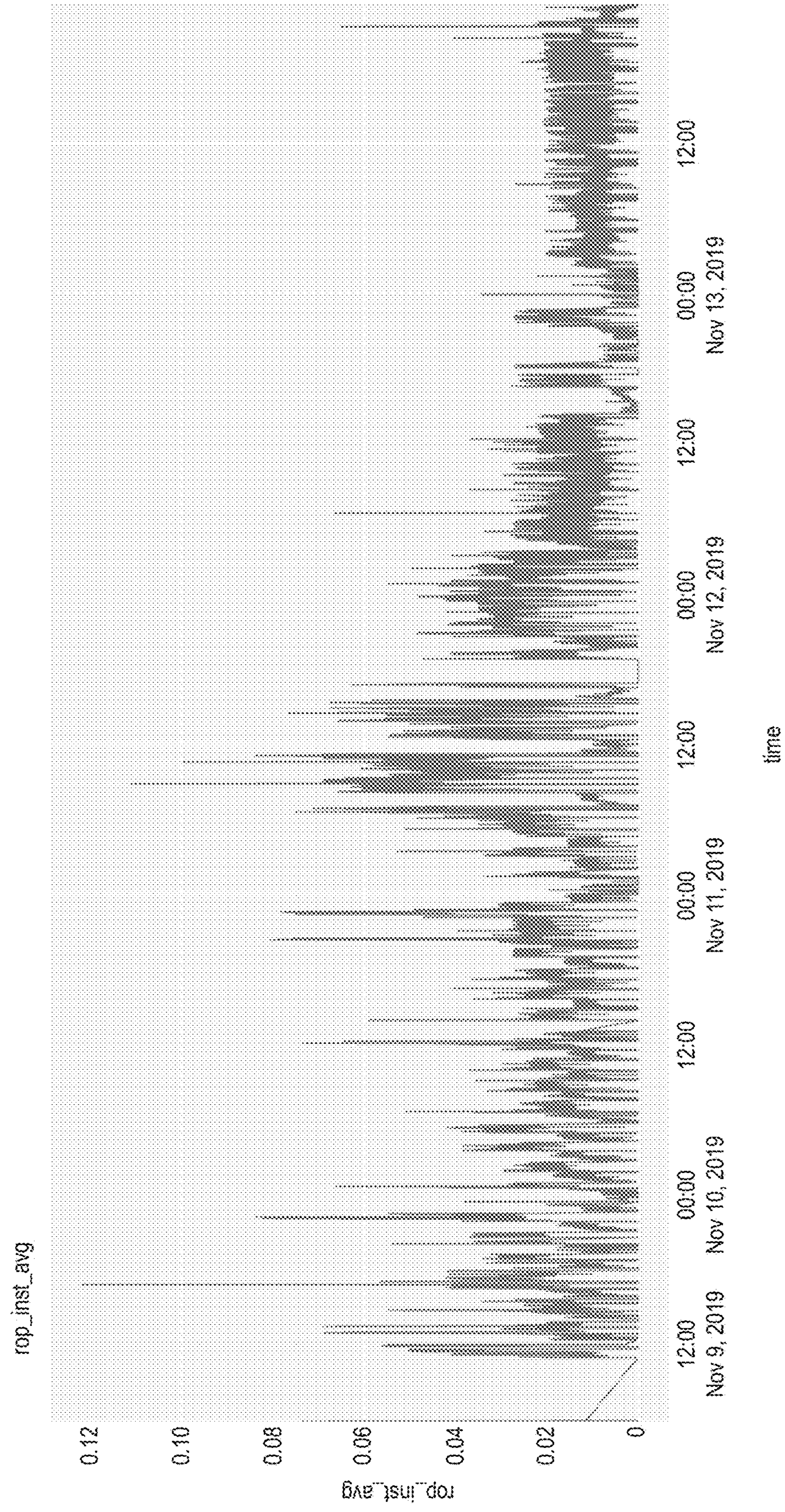
Figure 5B:
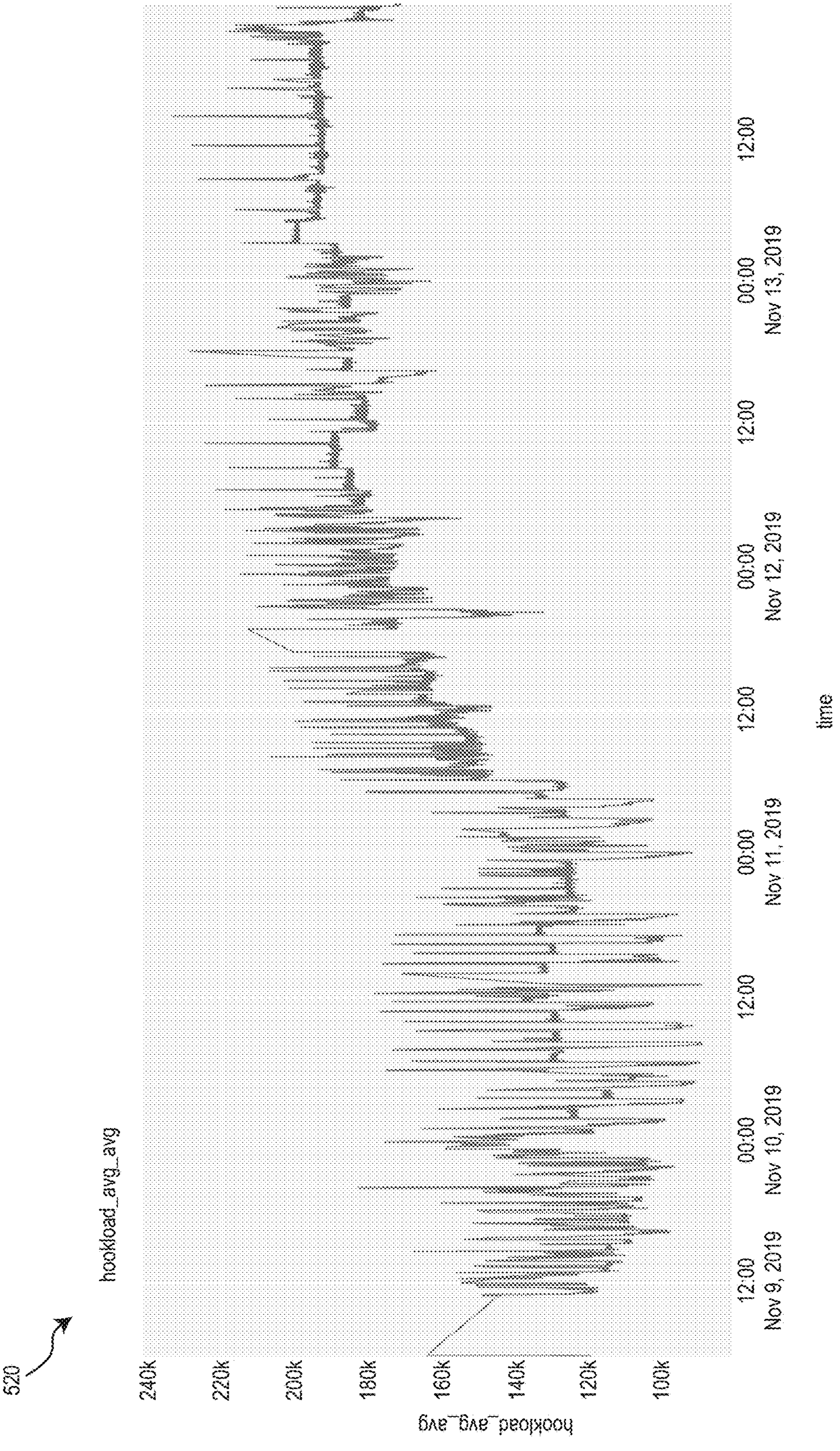
Figure 5C:
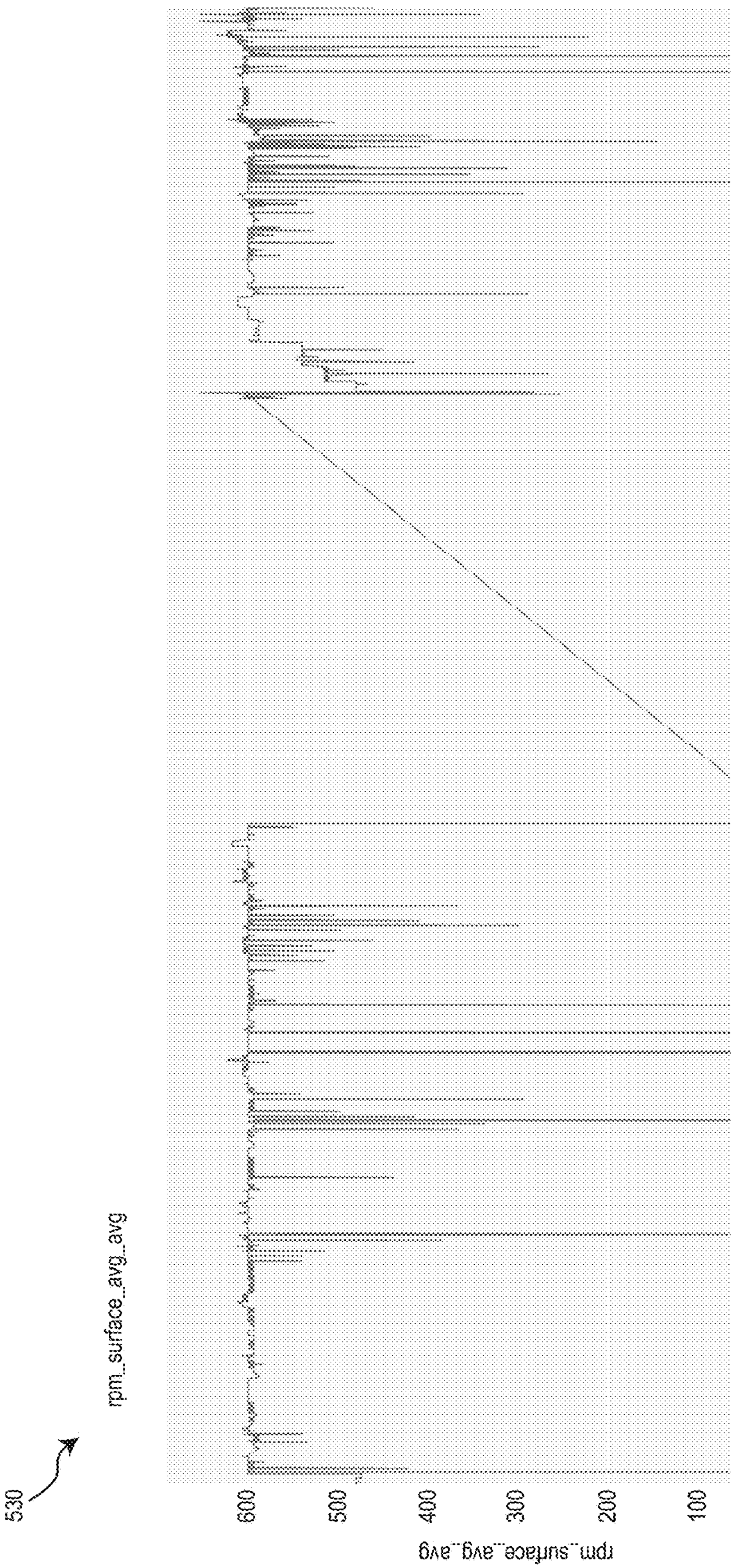
Figure 6A:
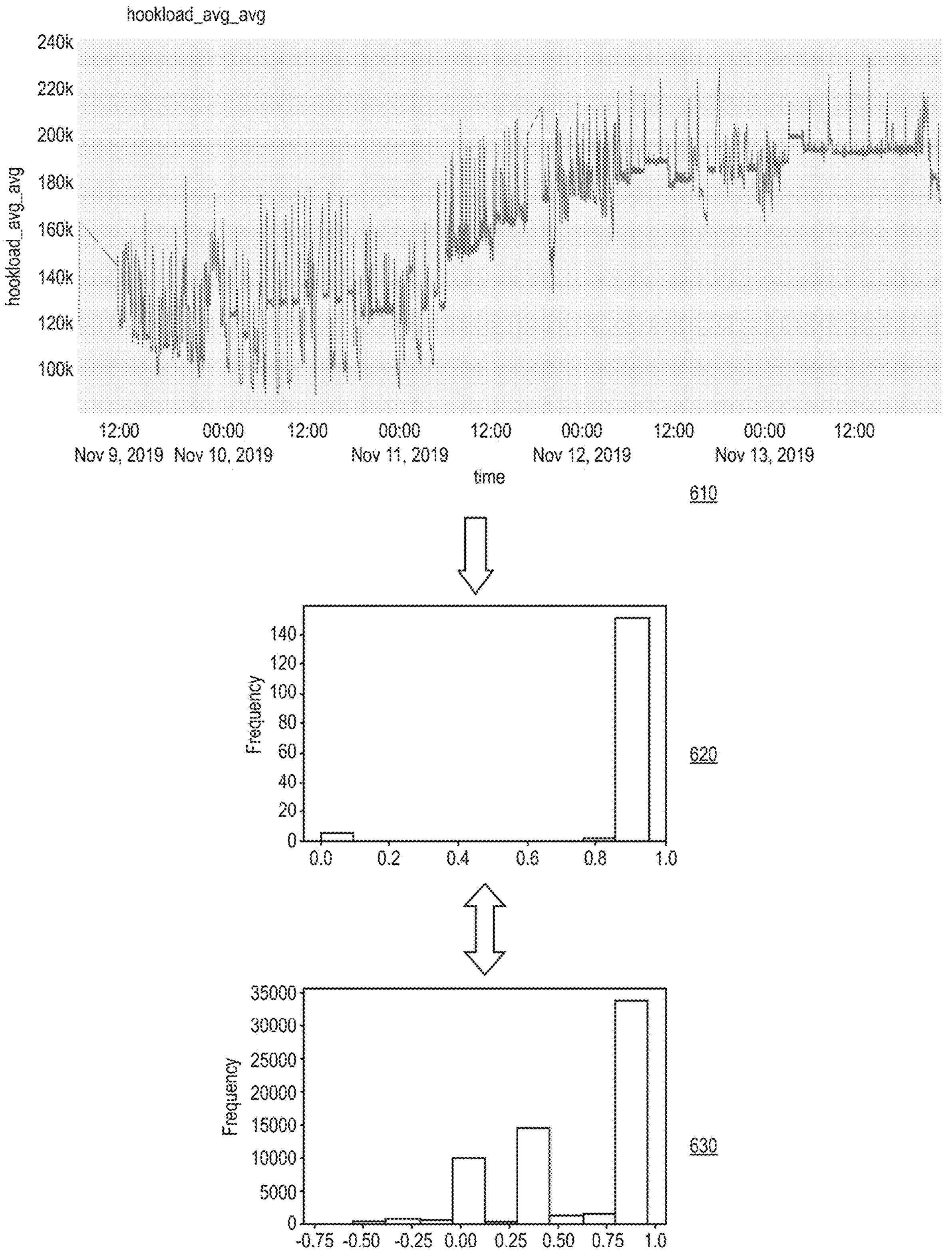
Figure 6B:
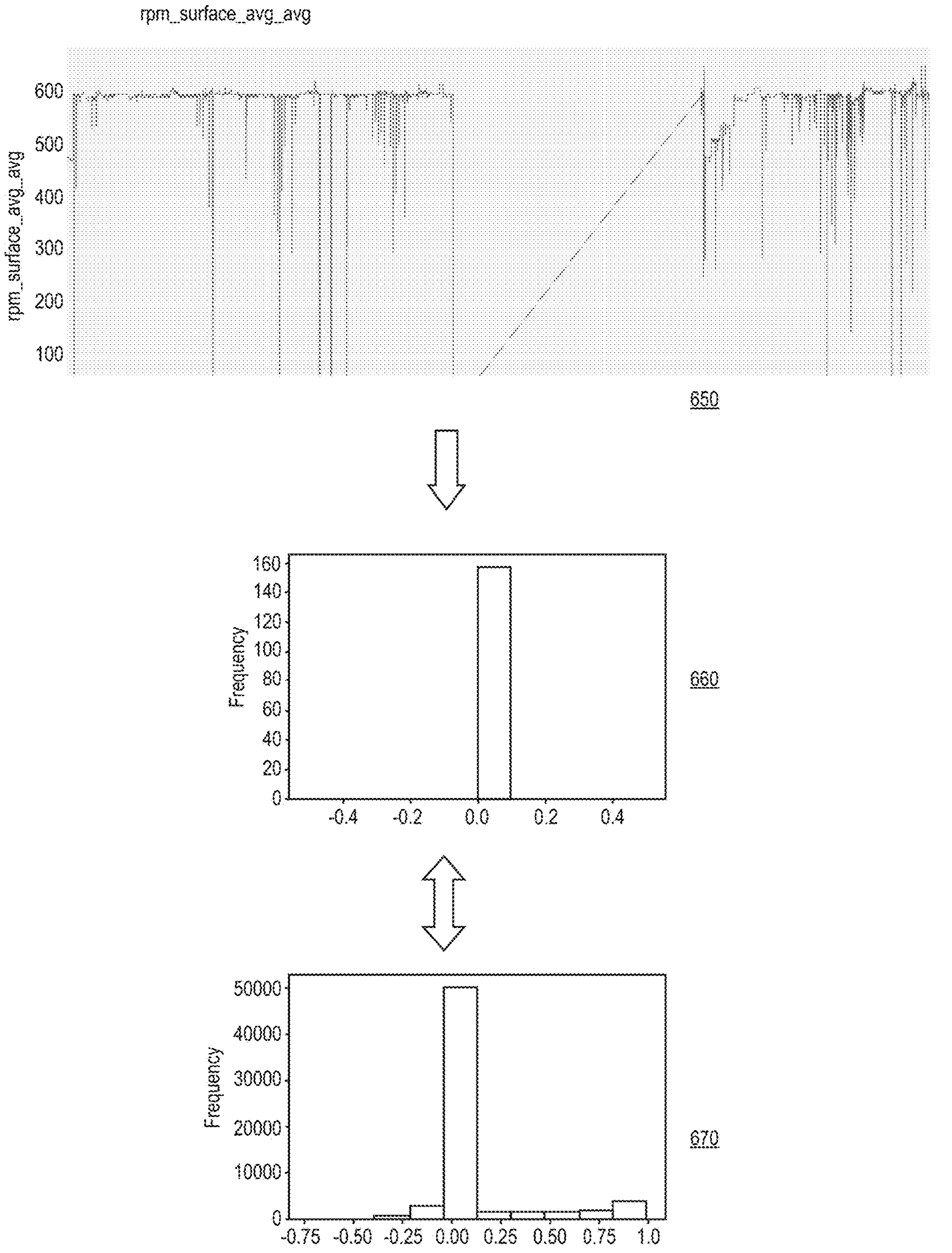

FIGS. 5A-C are illustrations of some of physics-based general signal behaviors;

FIGS. 6A and 6B are illustrations of how historic signals may be searched using some of the physics-based general signal behaviors according to the principles of the current disclosure.

Figure 7:
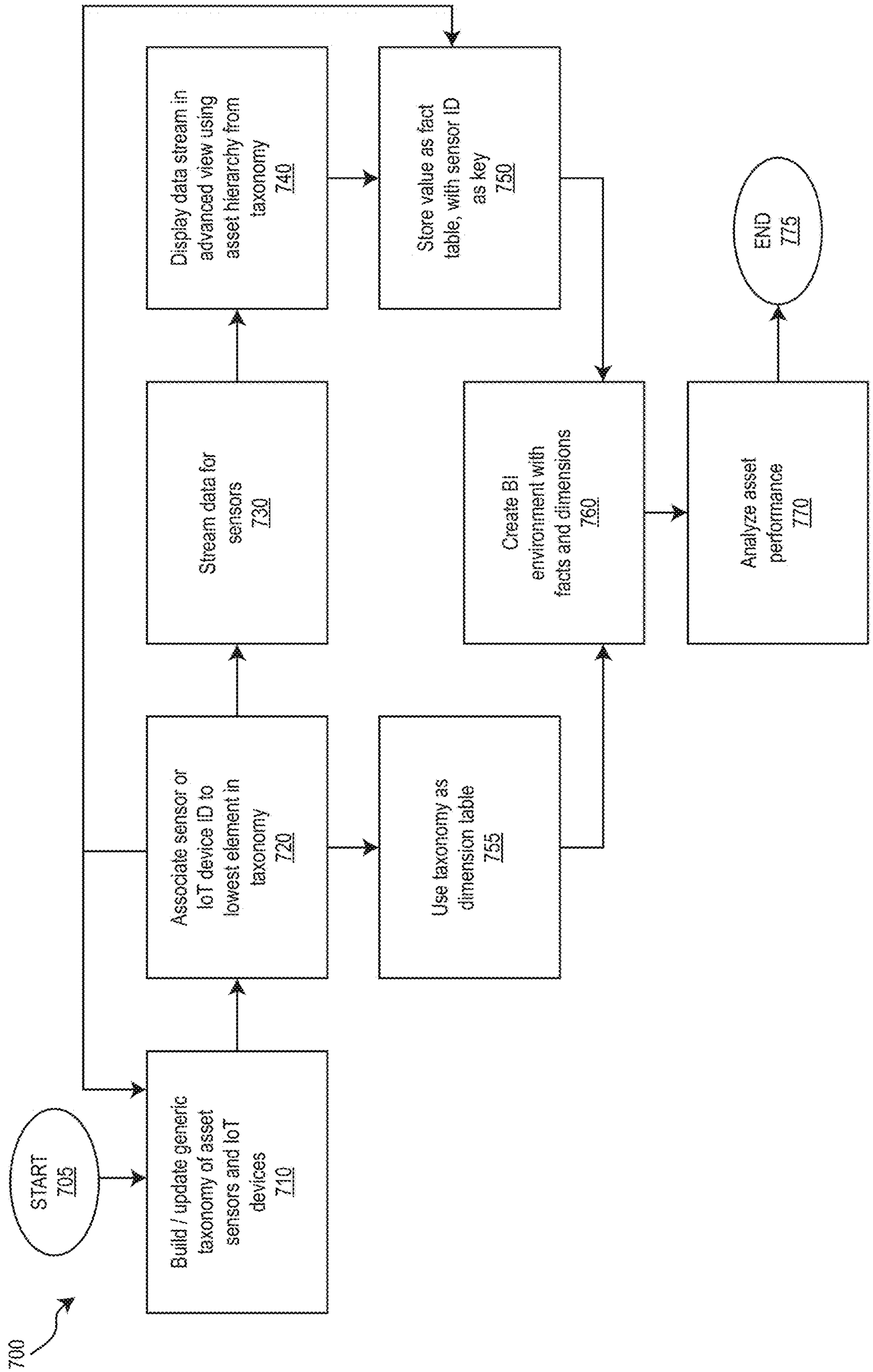
Figure 8:
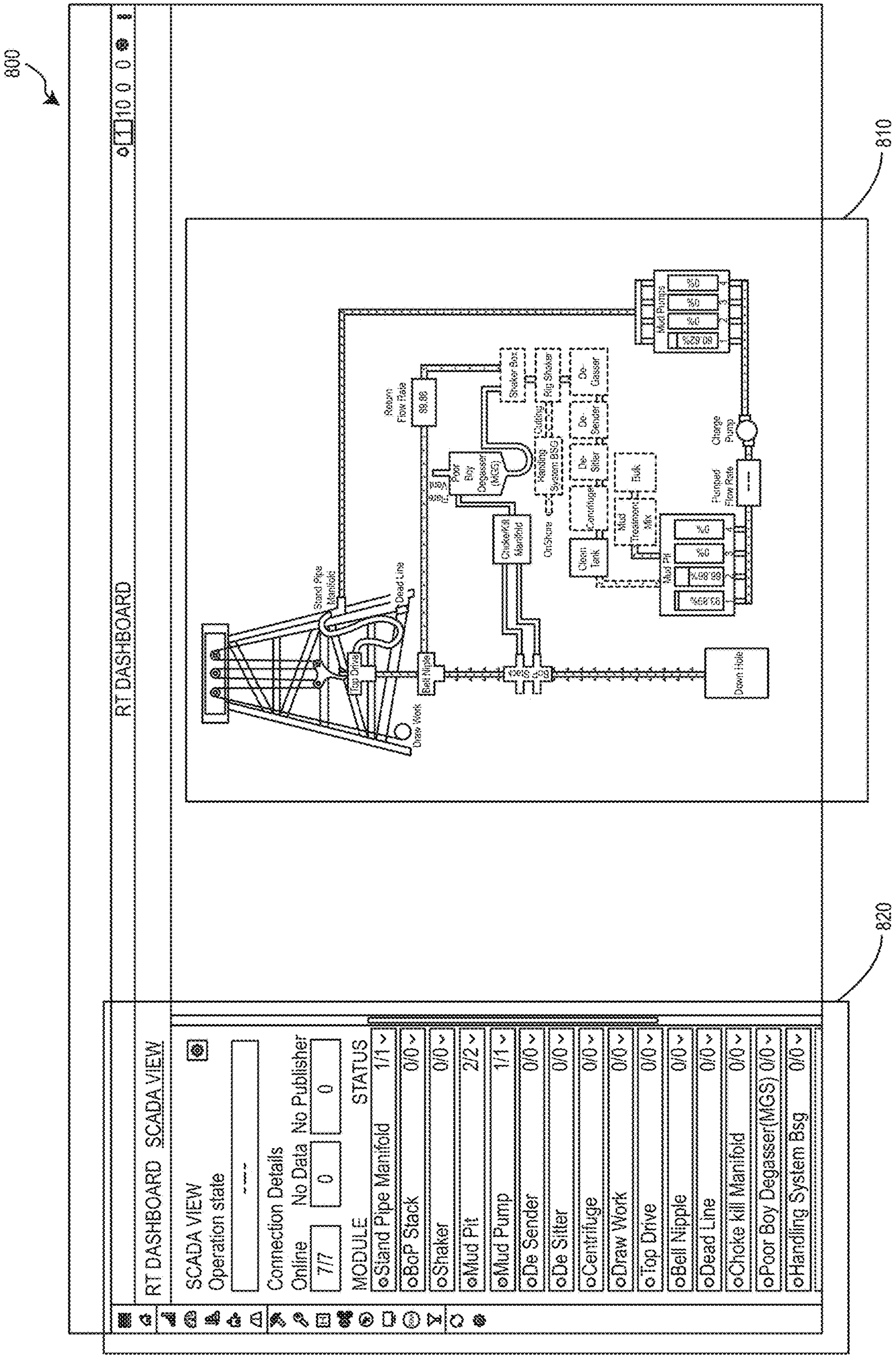

FIG. 7 is a flow chart of an example of a method for performing a taxonomy of signals according to the principles of the current disclosure; and FIG. 8 is an illustration of an advanced view of signal streams in the element hierarchy.

DETAILED DESCRIPTION

Current real time systems in the petroleum industry do not automatically differentiate between various streams coming from various sensors and IoT devices of the service providers. But with IoTs and sensors becoming more prevalent and diverse, it is realized herein that differentiating streams from various sensors and IoTs manually will become more challenging, not only for the increasing numbers of the signals, but for the decreasing subtleties there between.

While taxonomies, ontologies, or semantic descriptions are still relatively new and abstract concepts in the petroleum industry, they may be used to differentiate or "dimension" the streams coming from different petroleum service providers and machines. It is also realized herein once the streams are logically dimensioned, the associated data or "facts" can be accessed through those logical dimensions from a standard BI system supporting oil field data.

The current disclosure introduces a technique that can identify each incoming data stream and associate them with descriptive taxonomies automatically so that they can be used to analyze the performance of an asset in a petroleum service environment. In one example, the introduced technique analyzes characteristics of incoming data streams and based on the analysis, identifies the sources of the data streams automatically. Using the identifies sources, the introduced technique maps the incoming data with descriptive taxonomies and stores the values and taxonomies of the data streams as facts and dimensions in a business intelligence (BI) data repository or warehouse.

By being able to automatically analyze and identify a source of each incoming data stream, the introduced technique can significantly reduce human intervention and efforts and hence reduce the number of human errors that were inevitable and costly. Also by being able to associate the incoming data stream with the taxonomies and store them as facts and dimensions in a business intelligence (BI) data repository, the technique can create an environment for BI analysis with various sets of logically nested dimensions and facts. This allows an end user to oversee various ongoing and past operations and analyze performances of assets in those operations. Furthermore, leveraging their similar hierarchical structures and elements, the introduced technique can expand and combine taxonomies and allow an end user to, not only analyze performances of assets in a specific rig or platform, but across multiple rigs or platforms and even across multiple projects, which were not possible before.

It is understood that the term "petroleum service environment" in the current disclosure is used to indicate any environment where petroleum services of various kinds can take place. The term "petroleum service environment" thus is not limited to any specific rig or platform or even any specific area or region. It is also understood in the current disclosure, the terms "data stream" and "signal" are used interchangeably.

Figure 1:
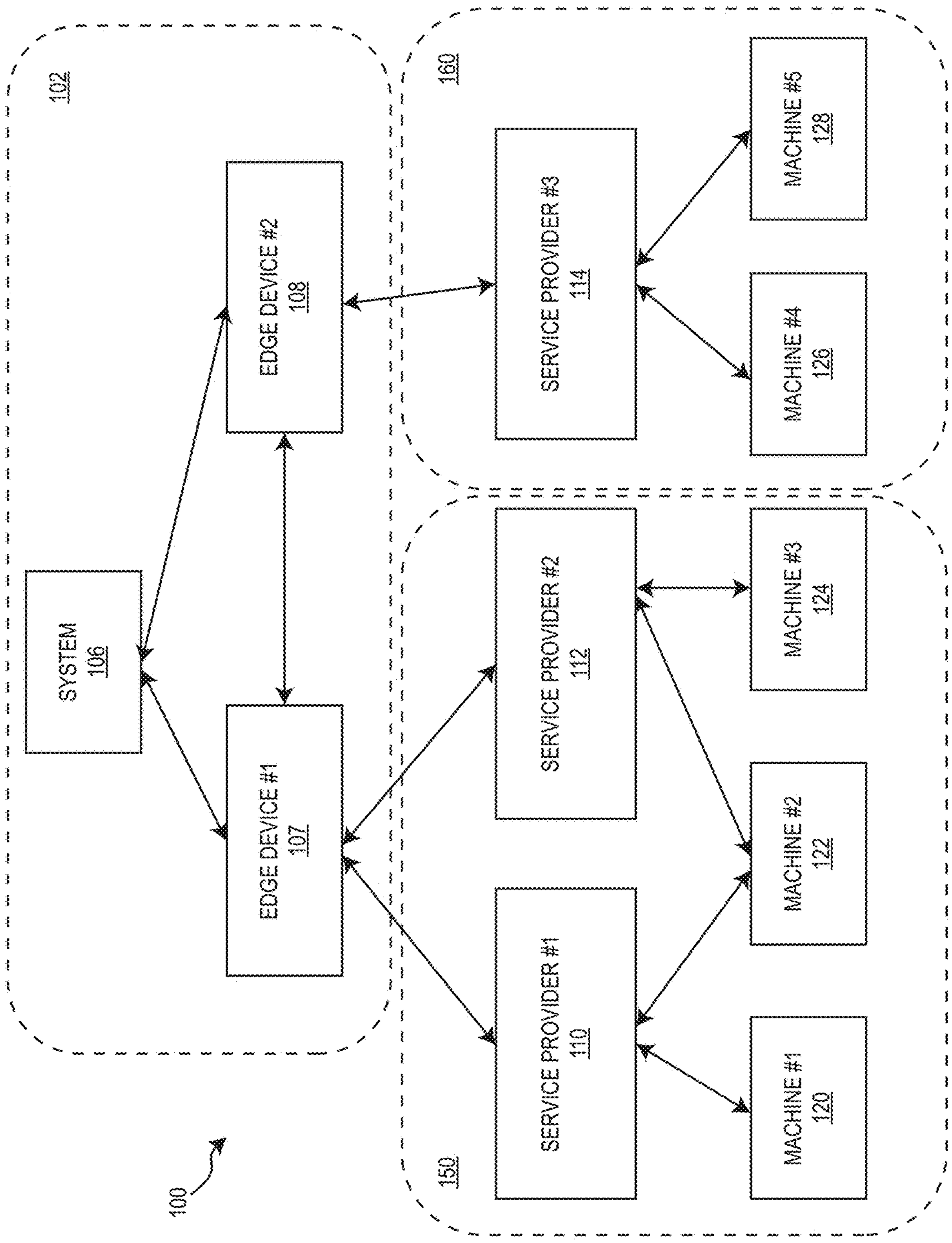
FIG. 1 is a block diagram of an example of petroleum service environment, in which an automatable signal discovery and taxonomy system configured according to the principles of the current disclosure may be utilized.

FIG. 1 illustrates a block diagram of an example petroleum service environment 100, in which an automatable signal discovery and taxonomy system 102 configured according to the principles of the current disclosure may be utilized. The system 102 may be a Real-Time-as-a Service (RTS) system that is communicatively connected to various service providers 110, 112, 114 at various rigs or platforms.

In the illustrated example, the system 102 includes a centralized system 106 that is communicatively connected to the service providers 110, 112, 114 via multiple edge devices 107, 108. Each of the edge devices 107, 108 is located approximate to a location or region or to a specific rig or platform that each respective edge device 107, 108 is responsible for. For example, the edge device #1 107 may be located near the first location 150 where the service providers 110, 112 are operating, and the edge device #2 108 may be located near the second location 160 where the service provider 114 is operating.

Each of the centralized system 106 and the edge devices 107, 108 may be implemented using a computing system that is capable of performing the introduced signal discovery and taxonomy techniques. As such, the introduced techniques can be performed entirely by any one of the centralized system 106 and the edge devices 107, 108 or performed together, in portions. The centralized system 106 may be a remote server, such as a cloud server, that may be accessed using conventional means, such as internet, while the edge devices 107, 108 may be only accessible using a private network connection.

It is understood that the numbers of the systems 102 including the numbers of the centralized system 106 and the edge devices 107, 108 within the system 102 are not limited as shown and they can vary. It is also understood that since the centralized system 106 is capable of performing the introduced technique by itself, the edge devices 107, 108 may be omitted in some instances. Having the edge devices 107, 108, however, can act as an additional security measure due to their private nature and also as additional points of accessibility for the end user.

The service providers 110, 112, 114 represent companies that provide oilfield related services such as directional company, production company, mud logging company, mud provider, and along-strong measurement vendor. In the illustrated example, the service providers 110, 112 are operating at an oil rig located in one location 150 while the service provider 114 is operating at a platform that is located in another location 160. It is understood that the numbers of the service providers and the oil rig and platform locations are not limited as shown and they can vary.

The service providers 110, 112, 114 receive various data including measurements and commands from various machines 120, 122, 124, 126, 128 and streams them as signals to the system 102 in real-time for the signal discovery and taxonomy. The service providers 110, 112, 114 are communicatively connected to their respective machines 120, 122, 124, 126, 128 using conventional wired connection means, such as an umbilical (wired), Private Network, Virtual Private Network or wireless connection means such as internet.

Upon receiving a signal, the system 102 can automatically deduce a source of the received signal, i.e., from which sensor or IoT device in which of the in the machines 120, 122, 124, 126, 128 the signal was transmitted. Once the source is deduced, the system 102 can automatically associate values of the signal with one or more predefined taxonomies of the petroleum service environment 100 based on the source of the signal. These values and their taxonomies can be used on the fly before or stored in a BI data repository, e.g., data warehouse, for future BI analysis. The system 105 can utilize the BI data repository for analyzing a performance of any of an asset, e.g., 120, 122, 124, 126, 128 in the petroleum service environment 105.

Figure 2:
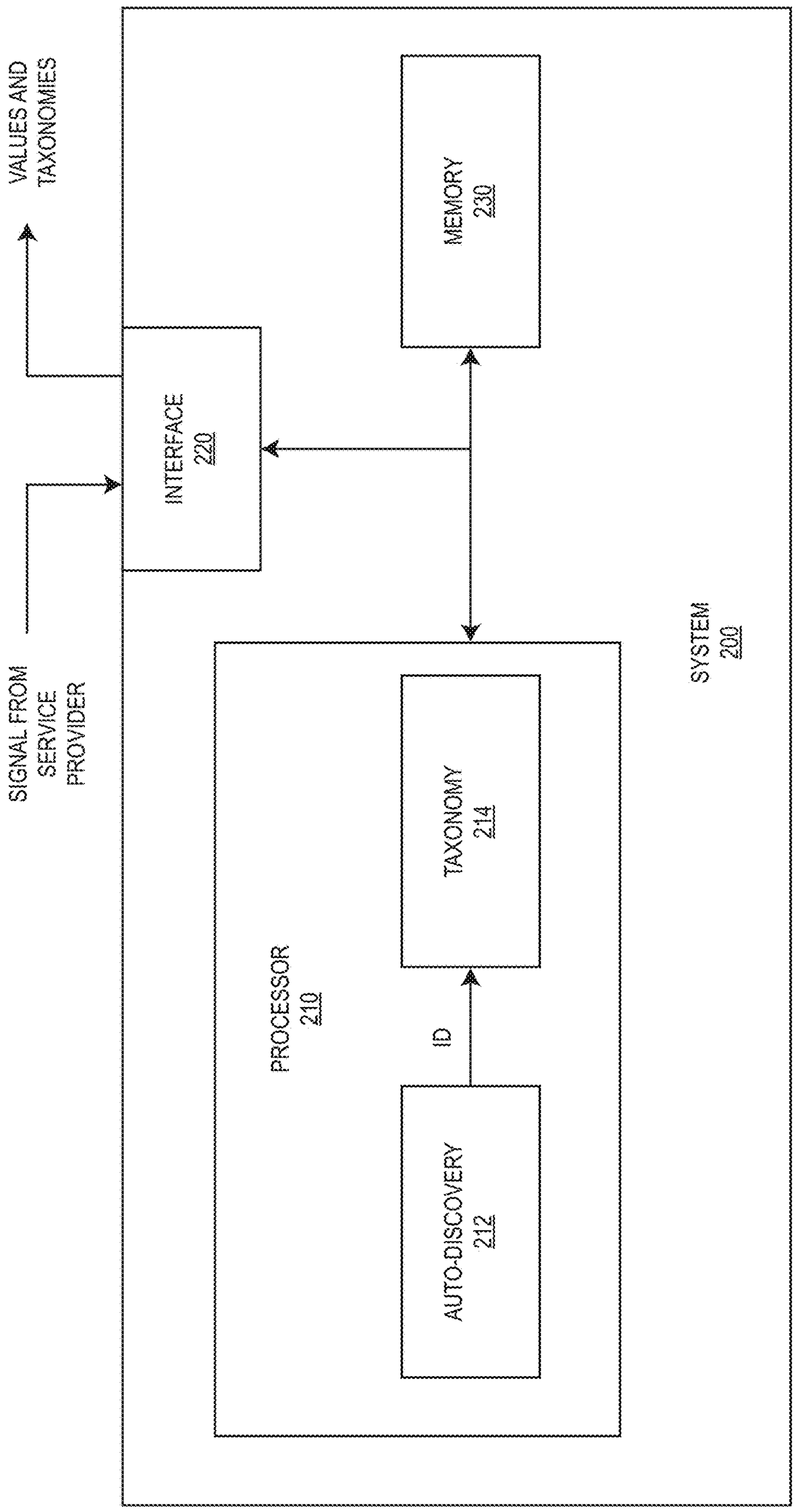
FIG. 2 is a block diagram of an example of an automatable signal discovery and taxonomy system configured according to the principles of the current disclosure.

FIG. 2 illustrates a block diagram of an automatable signal discovery and taxonomy system 200 configured according to the principles of the current disclosure, such as 102 in FIG. 1. In the illustrated example, the system 200 includes a processor 210, an interface 220, and a memory 230. The processor 210, the interface 220, and the memory 230 may be communicatively connected to one another using conventional means. The system 200 may be a physical computing system in a server, Docker Container or a virtual computing system implemented in a cloud server.

The processor 210 implements an auto-discovery module (ADM) 212 and a taxonomy module (TXM) 214. The processor 210 may implement each of the modules 220 and 230 using a computer model such as a mathematical model or a machine learning model. The processor 210 can feed a signal received from the interface 220 to the ADM 212 and relay data processed by the ADM 212 and the TXM 214 to the interface 220. The processor 210 can also allow the ADM 212 and the TXM 214 to communicate with one another. The processor 210 may be any data processing unit such as a central processing unit, a graphics processing unit, and a hardware accelerator.

The interface 220 allows the system 200 to communicate with various service providers and machines in a petroleum service environment, and also with an end user, e.g., an engineer or analysist. Although illustrated as a single unit, the interface 220 may be separated into multiple units based on the ways or communication protocols the interface 220 needs to support. For example, there may be one interface interacting with the service providers and machines and another one for interacting with the users. The interface 220 may be a conventional networking interface controller that is discrete from the processor 210 or one that is integrated into the processor 210.

The memory 230 allows the system 200 to store and access data that is needed in processing the introduced technique. For example, the memory 230 may store a series of instructions that when executed, causes the processor 210 to perform methods, such as 300 and 500 in FIGS. 3 and 5, using the ADM 212 and the TXM 214. The memory 230 may be a conventional memory device such as flash memory, ROM, PROM, EPROM, EEPROM, DRAM, SRAM and etc.

In the illustrated example, when provided with a signal received by the interface 220, the ADM 212 can automatically deduce a source of the signal based on its characteristics and assigns a unique source identifier to the signal. Some of the characteristics of the signal that are considered include a sampling rate, a range of values of the signal, a signature pattern/fingerprint of the signal, a feature/behavior of the signal and a correlation of the signal with previously received identified or unidentified signals.

In the illustrated example, the TXM 214 provides an environment for a business intelligence (BI) analysis by creating and maintaining a BI data warehouse/repository. The TXM 214 defines one or more taxonomies of the petroleum service environment and populates the one or more taxonomies with hierarchies of elements. When a unique source identifier of a received signal is provided from the ADM 212, the TXM 214 updates the BI data repository by associating the signal with one or more taxonomies of the petroleum service environment and storing them in the BI data repository. Data stored in the BI data repository, e.g., values, sources and taxonomies of signals, can be sorted and accessed using the unique identifier as a key to analyze performance of an asset.

It is understood that as the system 200 may be implemented using multiple computing systems, e.g., as a combination of a centralized system and edge devices, and all of the functions and components of the system 200 do not have to be in a single system as shown. For example, the above described functions of the ADM 212 and the TXM 214 can be implemented using multiple computing systems, and the components such as the processor 210 and the memory 230 can be in separate computing systems.

Figure 3:
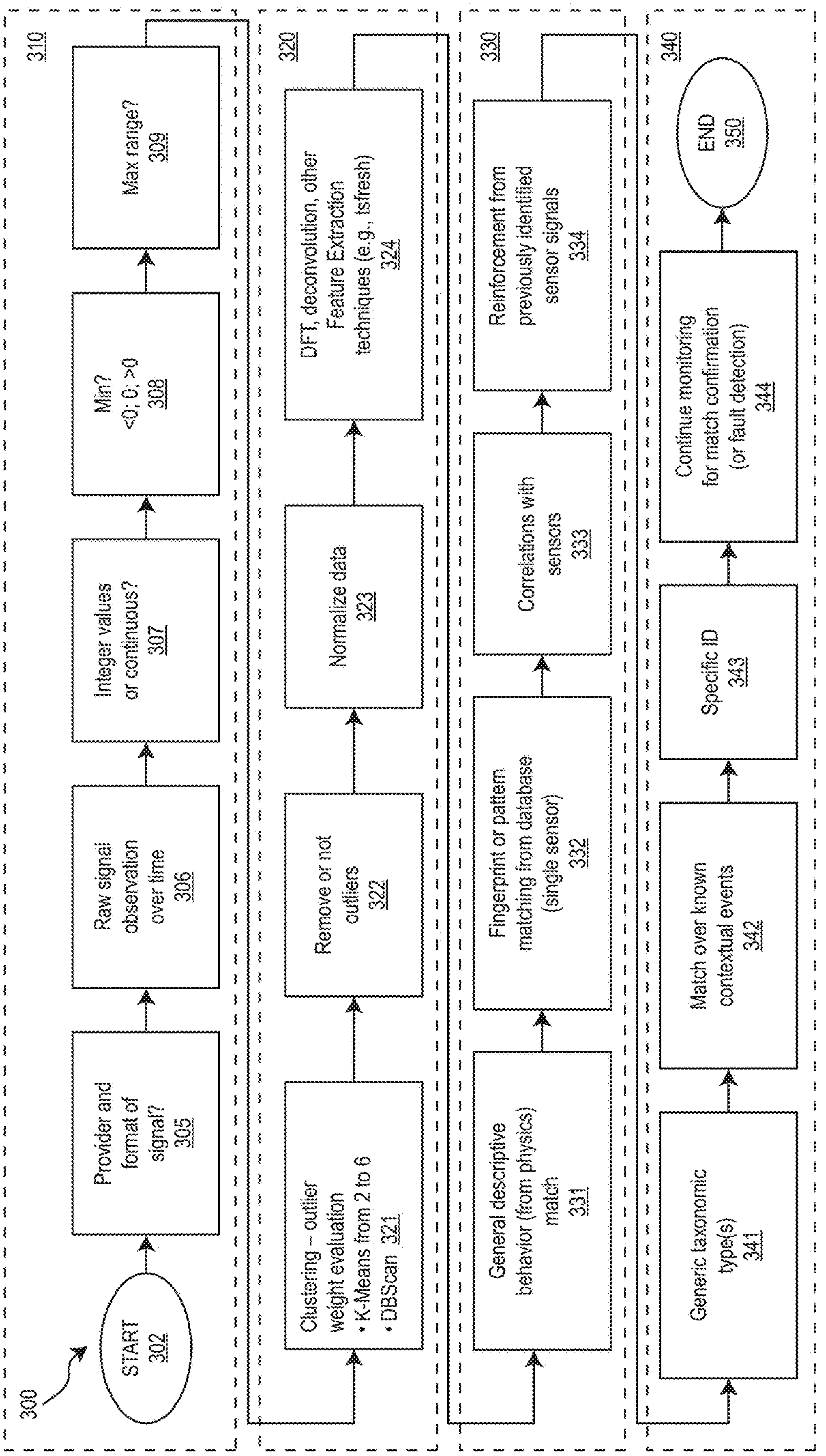
FIG. 3 is a flow chart of an example of a method for discovering a source of signal according to the principles of the current disclosure.

FIG. 3 illustrates a flow chart of an example of a method 300 for discovering a source of signal. The method 300 may be performed automatically using an ADM such as 212 in FIG. 2, which is implemented using a computer model. The method 300 starts at step 305 when signal is received from a service provider overseeing operations at a rig or a platform in a petroleum service environment. In some instances, the signal may be received directly, e.g., without traversing through a service provider, from a machine of the service provider. The received signal is referred in the method 300 as "current signal."

The method 300 is generally divided into 4 stages. During the first stage 310, which includes Steps 305-309, the current signal is classified based on its generic and range-based categories. During the second stage 320, which includes Steps 321-324, the current signal is further processed to extract its feature/behavior. During the third stage, which includes Steps 331-334, possible sensors, from which the current signal may have been transmitted, are found. During the fourth stage, which includes Steps 341-344, the current signal is assigned with a unique ID that identifies the source of the current signal. The method 300 starts at step 302.

Going into the first stage 310, the ADM determines a generic category, i.e., a service provider and a format of the current signal, at step 305. The service provider and format of the current signal may be determined based on a transmitter of the current signal, a file extension and/or a communication protocol used to transmit the current signal. The communication protocol may include any conventional file or packet extension/form and data transfer protocol/standard/specification that are used in the petroleum industry, such as Wellsite Information Transfer Specification (WITS), Wellsite Information Transfer standard markup language (WITSML), OPC classic, OPC UA & DA, Modbus, Profinet, Profibus, and other proprietary and standard communication protocols. For example, the current signal may be determined to be from a specific drilling contractor at a particular rig/platform based on a stream or interface ID assigned to that drilling contractor, and the format of the signal may be determined based on an extension of the current signal, e.g., .xls for an excel file.

At step 306, the current signal is observed over a period of time. While or after observing, the ADM determines the range based category of the current signal over steps 307-309. In the illustrated example, the ADM determines a sampling rate, i.e., whether values of the signal are discrete or continuous over time, of the current signal at step 307, determines whether the minimum value of the current signal is greater, lesser or equal to zero at step 308, and determines a range of values of the current signal at step 309. It is understood that while they are performed in an ascending order in FIG. 3, the steps 307-309 may be performed in a different order.

Based on these determinations made during the first stage 310, the ADM can determine the generic and range-based categories the current signal belongs. These categories are used later in the method 300 to make an educated guess on the general identity of the signal. For example, continuous nature usually indicate that the current signal is measurement signal while discrete nature usually indicates that it is a command or set point from an operator. If the minimum value of the current signal is always greater than zero, it may indicate a measurement that is always positive such as a position above ground or sea level. Also if the range of values is around a big number such as 20 k, while it can indicate a depth measurements, it cannot indicates a volume or peak level of a tank as such values hover around 35.

At the second stage 320, the ADM processes the current signal to obtain its features. First, the ADM performs an outlier weight evaluation by clustering values of the current signal at step 321. This allows the ADM to distinguish the main range or body of the current signal. Some of the clustering algorithms that may be used at step 321 include: a k-means clustering, e.g., from 2 to 6, and a Density-Based Spatial Clustering of Application with Noise (DBSCAN).

At step 322, the ADM detects and removes outlier values from the signal. From the clustered values, the AMD can determine whether those values at the edges or outside of the main body are outliers by determining their consistency throughout the observed time period. For example, those values that consistently/repeatedly sit outside or at the edge of the main body across the entire observed time period cannot be considered as outliers whereas data that sit outside or at the edge of the main body only a few times, e.g., one or two times throughout the entire observed time period, can be considered as outlier.

Once removed, the ADM normalizes the values so that they can be in a notionally common scale with values of other signals to be compared at step 323. Any conventional normalization technique can be used.

At step 324, the ADM performs a signal transformation to the normalized values to extract a distinguishable feature/behavior of the current signal. Some of the signal transformation techniques that may be used includes: mathematical algorithms such as Discrete Fourier Transform (DFT), Fast FT, and deconvolution, or other feature extraction techniques such as those in the tsfresh library that provide standard behavior description algorithms such as Benford correlation.

Figure 4A:
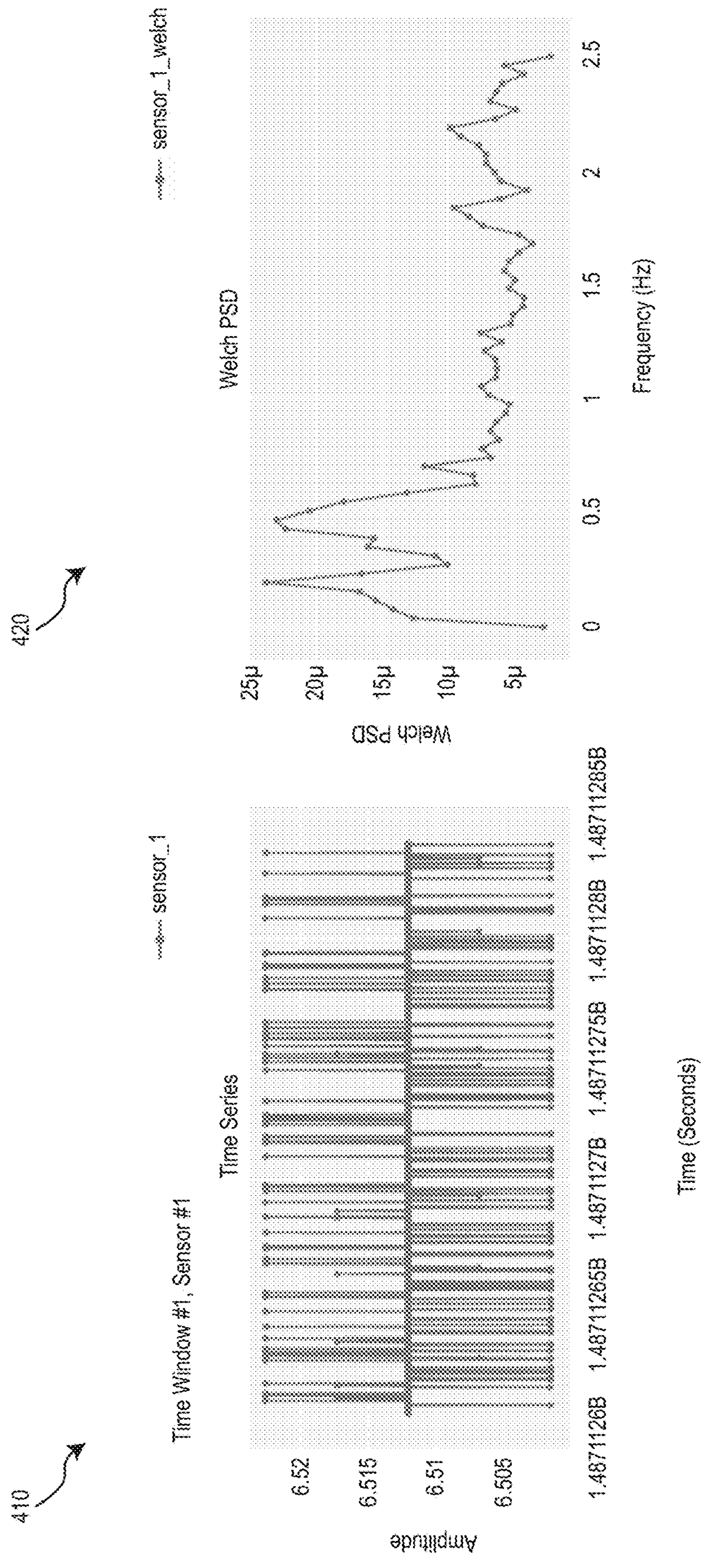
FIGS. 4A and 4B are illustrations of example data sets before and after the feature extraction according to the principles of the current disclosure.
Figure 4B:
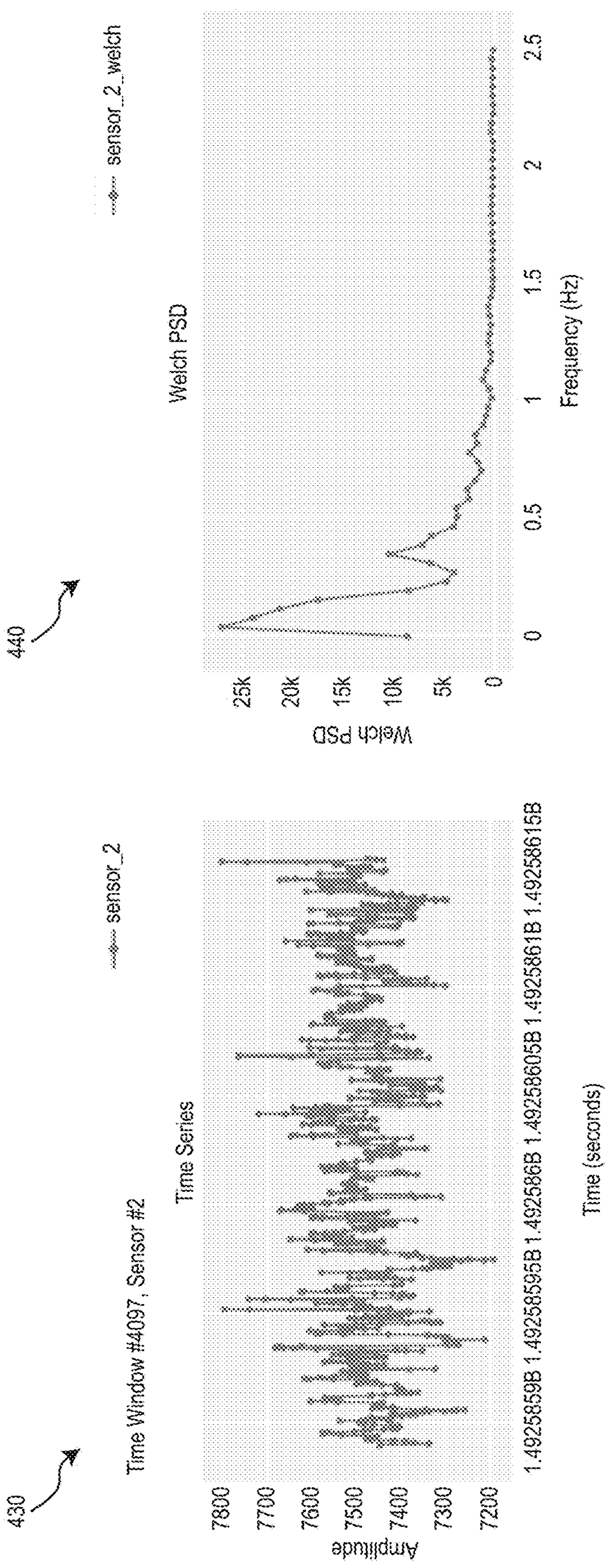

FIGS. 4A and B illustrate example sets of data before and after the feature extraction. FIG. 4A illustrates a first sensor signal before 410 and after 420 the feature extraction, and FIG. 4B illustrates a second sensor signal before 430 and after 440 the feature extraction. In the illustrated examples, Welch FFT/Power Spectral Density technique has been used.

During the third stage 330, the ADM matches the behavior of the data determined at step 324 with physics-based general behaviors of signals. First, the ADM compares the extracted behavior/feature of the current signal with physics-based general behaviors of signal to find one or more of the physics-based general behaviors that closely match the extracted behavior of the current signal at step 331.

Some of the general behaviors includes: a first behavior 510 illustrated in FIG. 5A that oscillates rapidly between zero and a trending value with quick instant peaks; a second behavior 520 illustrated in FIG. 5B that has an average trending slowly up or down, with oscillations of generally constant lengths; and a third behavior 530 illustrated in FIG. 5C that is generally constant on average over long period of times, with some minimal oscillations and mostly brief returns (while some being longer) to zero from time to time in a somewhat regular pattern. One example of sensor signals that behave similar to the first behavior 510 is Instantaneous rate of penetration (ROP) values, one example of the second behavior 520 is hookload sensor signal, and one example of the third behavior 530 is a surface RPM sensor signal.

It is understood that the physics-based general behaviors of signal is not limited to the illustrated behaviors, and may include other expected behaviors, such as a behavior that can be expected from values of a fluid or air temperature sensor that hold steady with slow evolution time, a behavior that can be expected from a vibration sensor of a downhole tool that vary widely but generally around one mean associated to a setting of the tool and with one or more frequencies associated with a formation response.

At step 332, the ADM searches a database of historic sensor signals for historic sensor signals that exhibit the one or more physics-based general behaviors found at step 331. The database may be initially prepared, e.g., before the method 300, using historical sensor signals of the current petroleum service environment, i.e., the one from which the current signal is streaming, or others that are located close to the current one.

FIGS. 6A and B illustrate examples of how historic signals may be searched using the general signal behaviors at step 332. In FIG. 6A, extracted features 620 of first unknown historic signal 610 is found to be highly correlated to the features 630 of hookload signals. In FIG. 6B, extracted feature 660 of second unknown historic signal 650 is found to be highly correlated to the features 670 of surface RPM signals. In the illustrated examples, Benford correlation is used for feature extraction.

At step 333, the ADM determines the current signal's correlations with sensors using the historic sensor signals found at step 332. The current signal's correlations can be determined by finding sensors that are correlated with the historic sensor signals found at step 332 as the current signal and the historic sensor signals of step 332 share similar features.

In one example, instead of going through steps 331-332, the ADM may directly determine the current signal's correlations with sensors using the features extracted at step 324. In that example, the method 300 may use a machine learning model that has been trained to determine correlated sensors of signal based on the signal's features. The machine learning model may be trained using historical sensor signals of the current petroleum service environment or others that are located close to the current environment.

At step 334, the ADM reviews previously identified sensor signals for reinforcement of the determination made at step 333. Of all the previously identified sensor signals, those signals that have been identified as to come from one of the sensors determined at step 333 would be of particular interest to the ADM. For example, comparing a number of signal streams from a particular sensor to a number of equipment that have the particular sensor at a rig, the ADM can deduce whether the current signal is coming from that particular sensor.

By the end of third stage 330, the ADM can make an educated guess of an identity of the current signal. While the guess may not be 100% accurate at this point, it may be good enough to make out at least a few generic taxonomic types, e.g., certain type or kind of sensors, for the current signal.

The method 300 proceeds to the fourth stage 340 where the ADM assigns a specific ID to the current signal. As a first step 341 of the fourth stage 340, the ADM selects one or more generic taxonomic types of the sensors determined at step 334. More specifically, the one or more generic taxonomic types of the sensors are selected based on the results from the first and third stages 310 and 330, such as the generic and range-based categories determined at steps 305 and 307-309, and the sensors identified at steps 333 and 334. For example, the ADM can determine based on the results of the first and third stages 310 and 330 that the source of the current signal is one of mud pump sensors at three mud pumps operated by a particular drilling service provider at a particular rig.

At step 342, the ADM narrows down the number of possible sensor choices by observing the current signal over known contextual events that involve one or more generic taxonomic sensor type of step 341. The contextual events may include certain operations that involve certain equipment and its sensors. For example, by observing the current signal during a series of mud pump tests that determine what is known as "Slow Circulating Rates" of each pump under the current mud conditions, the ADM can determine which of the pumps the current signal belongs to.

At step 343, the ADM determines the source of the current signal based on the results of step 342 and assigns a unique source identifier, which corresponds to one of sensors or IoTs in the petroleum environment. It is understood that the source determination process may not have to identical to the process discussed above. For example, instead of using the results of the first stage 310 at step 341, it can be used here at step 343 or even used with the machine learning model mentioned above.

At step 344, the current signal is continuously monitored for a predefined time period to confirm the source determined at step 343. The step 344 ends when either the time period expires or a confirmation or a fault (mismatch) is detected. The confirmation occurs when another characteristic of the source is found during step 344, and the fault occurs when the current signal behaves out of its character, e.g., when the current signal does not produce expected data, e.g., if the signal goes out of the expected range. When the fault occurs, the method 300 may loop back the beginning of the fourth stage 340 and try another generic taxonomic type or sensors. Once the confirmation is made, the method 300 moves to step 350 and ends.

The illustrated method 300 may be performed automatically, i.e., without any user intervention other than receiving a signal to be identified. Once started, the method 300 may execute each step and move on to the next step automatically until it reaches the last step 350. As the method 300 does not require any human intervention, it can significantly reduce the amount of time and effort that is normally required from human to manually analyze and identify signal. Also, because the method 300 utilizes a computer model, e.g., mathematical and machine learning model, the method 300 can also reduce the amount of human errors, intentional or unintentional, in analyzing and identifying signals.

It is understood that the method 300 does not need to be performed by a single computing system as illustrated. The method 300 may be performed using multiple computing systems, e.g., using processors of a centralized system and edge devices, with each system possibly carrying out different steps of the method 300.

FIG. 7 illustrates a flow chart of an example of a method 700 for performing a taxonomy. At least a portion of the method 700 may be performed automatically when a new unique source identifier is determined using the method 300. The method 700 may be performed using a TXM, such as 230 in FIG. 2. The method 700 starts at step 705.

At step 710, generic taxonomies of a petroleum service environment, such as 100 in FIG. 1 is built. Step 710 includes defining the taxonomies of the petroleum environment and building a hierarchy of elements for each of the taxonomies. Each of the taxonomies will have its own logic for its hierarchy.

The taxonomies include, for example, a first taxonomy that is related to physical locations of equipment in the petroleum environment, a second taxonomy that is related to types of operations being performed in the petroleum environment, and a third taxonomy that is related to types of measurements being used in the petroleum system. Each of the elements represents equipment in the petroleum environment, a unit of measurement used in the petroleum environment, or an operation being performed in the petroleum environment depending on the taxonomy the elements belong.

For example, under the physical location taxonomy, a voltage sensor might be associated with a top drive rotation; a top drive; derrick and mast equipment, and a Rig, and a flow sensor might be associated with the pump #2 outflow; mud pumps; surface equipment; and a Rig. Under operation type taxonomy, a rotation of a voltage sensor may be associated with a drill pipe handling; lifting system; and a rig management, while pump #2 outflow of the flow sensor may be associated with a well inflow; a mud circulation; fluid circulation; fluid management; a rig management. Under measurement type taxonomy, rotation measurements from rotating equipment such as top drive, mud motors, etc. may be associated with each other, and pressure measurements from flow pumping equipment may be associated together.

It is understood that while specific presence or number of units, their characteristics, their associated sensors may vary, the general taxonomy of drilling rigs or production units do not vary much. As such, once higher-level taxonomy is built, only lower level may need to be updated over time. It is also understood that the taxonomies may include some elements that are calculated based on combination of sensor data.

At step 720, a specific sensor or IoT device, from which a signal was transmitted, is associated with at least one of the lowest elements in each type of taxonomies. The specific sensor or IoT device can be indicated by the unique source identifier of the signal. Step 720 can be performed automatically depending on the standard protocol used to stream the current signal (WITS, WITSML, MQTT, OPC UA/DA, Modbus, etc.). When there is no element in the taxonomies, with which the specific sensor/IoT ID can be associated, the method 700 moves back to step 710 to add a corresponding element to the taxonomies.

Since each taxonomy is a hierarchy of elements, when a sensor is associated with one of the lowest elements of a taxonomy, the signal becomes automatically associated with other elements in the taxonomy that are connected, directly or indirectly, to that lowest element, with which the signal was first associated. For example, if a pressure senor is associated with a first mud pump of a rig in a physical location taxonomy, that pressure sensor becomes automatically associated other equipment in the taxonomy that are connected to the first mud pump, such as the second and third mud pumps located at the same level of hierarchy as the first mud pump, along with other equipment that are located at higher levels of hierarchy.

Steps 730 and 740 are optional steps that may be performed when requested by a user. At step 730, signals from the sensors and IoT devices in the petroleum environment are streamed. The signals may show individual log traces, gauges, videos, etc. and variations of values over time (frequency might vary depending on the types and characteristics of sensors).

At step 740, at least one of the streamed signals is displayed in an advanced view using the element hierarchies of the taxonomies. For example, the advanced view may show a physical group taxonomy of an asset, such as a circulation system or a rig, allowing the user to have more holistic view of operations, e.g., Digital Twin.

FIG. 8 illustrates an example of this advanced view 800 displaying the data stream in an element hierarchy. The view 800 shows an element hierarchy 810 on the right and the menu on the left 820. The hierarchy 810 shows not only where the streamed signal is coming from, but also show how the streamed signal, which has been assigned to one of the elements at the bottom of hierarchy at step 720, is interrelated and may affect the operations of other equipment in the hierarchy 810.

Upon the association at step 720, the method 700 may automatically proceeds to step 750, where values of a signal are stored as facts in fact tables, with a unique source identifier of the signal as a key. Instead of soring values in a conventional system such as SCADA, DCS, and Historians, the values are brought into a BI data repository/data warehouse and stored as facts in fact tables in the method 700. Sensor metadata is stored in parallel, also with the unique source identifier is the key.

As values of the signal is stored as a fact table at step 750, elements of the taxonomies of the signal are stored as dimensions in a dimension table at step 755. Dimension represents the reference information that give context to the related facts. Similar to the facts, the unique source identifier serves as a key to the dimension table.

It is understood that using a BI data repository/data warehouse provides the following benefits. First, it allows an integration of data from multiple sources into a single database and data model; second, it mitigate the problem of database isolation level lock contention in transaction processing systems caused by attempts to run large, long-running analysis queries in transaction processing databases; third, it maintains data history, even if the source transaction systems do not; fourth, it integrates data from multiple source systems, enabling a central view across the enterprise; fifth, it improve data quality, by providing consistent codes and descriptions, flagging or even fixing bad data; sixth, it presents the organization's information consistently and provides a single common data model for all data of interest regardless of the data's source; seventh, it restructure the data so that it makes sense to the business users and it delivers excellent query performance, even for complex analytic queries, without impacting the operational systems; eighth, it adds value to operational business applications, notably customer relationship management (CRM) systems; and finally, it Make decision-support queries easier to write and organizes and disambiguates repetitive data.

At step 760, an environment for BI analysis is created from the BI data repository/warehouse containing the facts and dimensions. The step 760 may be performed automatically following steps 750 and 755. The warehouse holds everything needed for auto-generation of multi-level analysis, with the associations clearly matched.

At 770, an asset performance is analyzed. An end user can now use the facts and dimensions to interrogate its data and slice and dice it. For instance, a power consumption analysis can be performed by comparing all sensors from the medium and high amperage group. Also as the taxonomies may include or be supplemented with calculated elements that are based on combination of sensor data, an analysis can be made with respect to an entire rig or activity such as to analyze total consumption, total emissions, total fluid or solid disposal of an entire rig. The method 700 ends at step 775.

It is understood that the method 700 does not need to be performed by a single computing system as illustrated. The method 700 may be performed using multiple computing systems, e.g., using processors of a centralized system and edge devices, with each system possibly carrying out different steps of the method 700.

It is understood at least a portion of the method 700 may be automated. For example, once started, the method 700 may proceed automatically up to step 760 without any user intervention or interaction. Doing so, the method 700 can significantly reduce the amount of time and effort that is normally required from human to manually create a BI data repository and environment. Also, because the method 700 utilizes mathematical and machine learning model that are much more accurate than human, the method 700 can reduce the amount of human errors, intentional or unintentional as well.

It is also understood that the created BI data repository is not used only for the asset performance analysis. The BI data repository can be also used for other business purposes such as performing analytics that quantifies processes for a business to arrive at optimal decisions and to perform business knowledge discovery, conducting business reporting that informs business strategy, facilitating collaboration both inside and outside the business by enabling data sharing and electronic data interchange, and performing knowledge management concerned with the creation, distribution, use, and management of business intelligence, and of business knowledge in general.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described examples. It is also to be understood that the terminology used herein is for the purpose of describing particular examples only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Aspects disclosed herein include:

A. A method for analyzing a performance of an asset in a petroleum service environment, comprising: 1) upon receiving a signal from a petroleum service environment, deducing a source of the signal based on characteristics of the signal; and 2) upon said deducing, creating a business intelligence (BI) data repository by associating values of the signal with one or more taxonomies of the petroleum system based on the source of the signal.

B. A system for analyzing a performance of an asset in a petroleum service environment, comprising: 1) an interface that receives a signal from a service provider of a petroleum service environment; and 2) a at least one processor that is connected to the interface and: a) when the signal received, deduces a source of the signal based on characteristics of the signal; and b) when the source is deduced, create a business intelligence (BI) data repository by associating values of the signal with one or more taxonomies of the petroleum service environment based on the source of the signal.

Each of the disclosed aspects A, and B can have one or more of the following additional elements in combination. Element 1: said creating includes defining the one or more taxonomies; and building a hierarchy of elements for each of the one or more taxonomies. Element 2: wherein each of the elements of the taxonomies represents one of: an asset, a type of measurement, or an operation. Element 3: wherein the one or more taxonomies include a first taxonomy that is related to physical locations of assets within the petroleum service environment, a second taxonomy that is related to types of operations performed by the assets, and a third taxonomy that is related to types of measurements being used by the assets. Element 4: wherein the characteristics include a sampling rate, a range of values of the signal, a feature or behavior of the signal and a correlation of the signal with previously received signals. Element 5: wherein said deducing includes: determining a generic category of the signal by identifying a service provider and a format of the signal based on a transmitter of the signal and a communication protocol of the signal; and determining a range-based category of the signal by determining a sampling rate and a value range of the signal. Element 6: wherein said deducing includes: clustering values of the signal; detecting and removing outlier values from the signal; normalizing the values of the signal; and extracting a behavior of the signal from the normalized values. Element 7: wherein said deducing includes: matching the behavior of the signal with at least one general signal behavior; identifying historic sensor signals that exhibit the at least one general signal behavior; determining a correlation of the signal with sensors; selecting one or more generic taxonomic types of the sensors based on the generic and range-based categories and the sensors; determining the source of the signal observing the signal over at least one contextual event involving the one or more generic taxonomic types of the sensors; and assigning a unique source identifier, which corresponds to one of available sensors or IoTs in the petroleum service environment, to the signal. Element 8: further comprising analyzing a performance of an asset of the petroleum system using the BI data repository, and wherein the asset includes at least one equipment of the petroleum system. Element 9: wherein said creating includes storing the values of the signal and the associated taxonomies in the BI data repository as a fact and a dimension, respectively. Element 10: wherein the at least one processor creates the BI data repository by: defining the one or more taxonomies; and building a hierarchy of elements for each of the one or more taxonomies. Element 11: wherein the at least one processor deduces the source of signal by: determining a generic category of the signal by identifying a service provider and a format of the signal based on a transmitter of the signal and a communication protocol of the signal; and determining a range-based category of the signal by determining a sampling rate and a value range of the signal. Element 12: wherein the at least one processor deduces the source of signal by: clustering values of the signal; detecting and removing outlier values from the signal; normalizing the values of the signal; and extracting a behavior of the signal from the normalized values. Element 13: wherein the at least one processor deduces the source of signal by: matching the behavior of the signal with at least one general signal behavior; identifying historic sensor signals that exhibit the at least one general signal behavior; determining a correlation of the signal with sensors; selecting one or more generic taxonomic types of the sensors based on the generic and range-based categories and the sensors; determining the source of the signal observing the signal over at least one contextual event involving the one or more generic taxonomic types of the sensors; and assigning a unique source identifier, which corresponds to one of available sensors or IoTs in the petroleum service environment, to the signal. Element 14: wherein the at least one processor further analyzes a performance of an asset of the petroleum system using the BI data repository, and wherein the asset includes at least one equipment of the petroleum service environment. Element 15: wherein the BI data repository is created by storing the values of the signal and the associated taxonomies in the BI data repository as a fact and a dimension, respectively.

What is claimed is:

1. A method for analyzing a performance of an asset in a petroleum service environment, comprising:

receiving a signal from an unknown source of a petroleum service environment, wherein the signal is transmitted by a transmitter using a communication protocol;

determining characteristics of the signal from one or more values of the signal, wherein the characteristics include a sampling rate and a value range of the signal;

automatically deducing a source of the signal in the petroleum service environment using a processor and the characteristics of the signal, wherein the automatically deducing includes automatically determining a range-based category of the signal using the sampling rate and the value range of the signal, normalizing the one or more values of the signal, extracting a feature of the signal by applying a transformation to the normalized values of the signal, correlating the extracted features with known sensors of petroleum service environments, reinforcing the correlating by comparing identified signals from a particular sensor of the petroleum service environment with the correlated known sensors, and identifying the particular sensor as the source of the received signal;

upon the deducing, creating a business intelligence (BI) data repository by automatically associating the one or more values of the signal with one or more taxonomies of the petroleum service environment based on the deduced source of the signal and the communication protocol used to transmit the signal; and overseeing an operation of at least one asset at one or more drilling rigs or production platforms of the petroleum service environment based on an analysis of data in the BI data repository.

2. The method of claim 1, wherein the creating includes:

defining the one or more taxonomies; and building a hierarchy of elements for each of the one or more taxonomies.

3. The method of claim 1, wherein each of the elements of the taxonomies represents one of: an asset, a type of measurement, or an operation.

4. The method of claim 1, wherein the one or more taxonomies include a first taxonomy that is related to physical locations of assets within the petroleum service environment, a second taxonomy that is related to types of operations performed by the assets, and a third taxonomy that is related to types of measurements being used by the assets.

5. The method of claim 1, wherein the characteristics further include a signature pattern of the signal.

6. The method of claim 1, wherein the correlating uses a machine learning model is trained using historic sensor signals of petroleum service environments to determine correlations between sensors of the petroleum service environments and signals based on features of the signals.

7. The method of claim 1, wherein the deducing further includes:

clustering the one or more values of the signal; and detecting and removing outlier values from the signal based on the clustering, wherein the normalizing of the one or more values of the signal is after removing the outlier values.

8. The method of claim 7, wherein the correlating includes comparing the feature of the signal to multiple general signal behaviors;

determining a match of the feature of the signal with at least one of the general signal behaviors;

identifying historic sensor signals that exhibit the at least one of the general signal behaviors; and determining a correlation of the signal with the known sensors using the identified historic sensor signals; and the deducing further includes:

selecting one or more generic taxonomic types of the sensors based on the generic and range-based categories and the sensors;

determining the deduced source of the signal by observing the signal over at least one contextual event involving the one or more generic taxonomic types of the sensors; and assigning a unique source identifier, which corresponds to one of available sensors or IoTs in the petroleum service environment, to the signal.

9. The method of claim 1, wherein the creating further includes:

storing the values of the signal and the associated taxonomies in the BI data repository as a fact and a dimension, respectively.

10. A system for analyzing a performance of an asset in a petroleum service environment, comprising:

an interface configured to receive a signal from an unknown source of a petroleum service environment, wherein the signal is transmitted by a transmitter using a communication protocol; and at least one processor connected to the interface to perform operations that include:

automatically determining characteristics of the signal from one or more values of the signal, wherein the characteristics include a sampling rate and a value range of the signal, and automatically deducing a source of the signal using the characteristics of the signal, wherein the automatically deducing includes determining a range-based category of the signal using the sampling rate and the value range of the signal, normalizing the one or more values of the signal, extracting a feature of the signal by applying a transformation to the normalized values of the signal, correlating the extracted features with known sensors of petroleum service environments, reinforcing the correlating by comparing identified signals from a particular sensor of the petroleum service environment with the correlated known sensors, and identifying the particular sensor as the source of the received signal.

11. The system of claim 10, wherein the creating includes:

defining the one or more taxonomies; and building a hierarchy of elements for each of the one or more taxonomies.

12. The system of claim 10, wherein the operations further include:

creating a business intelligence (BI) data repository when the source is deduced by associating the one or more values of the signal with one or more taxonomies of the petroleum service environment based on the source of the signal and the communication protocol used to transmit the signal; and overseeing an operation of at least one asset at one or more drilling rigs or production platforms of the petroleum service environment based on an analysis of data in the BI data repository.

13. The system of claim 10, wherein the one or more taxonomies include a first taxonomy that is related to physical locations of assets within the petroleum service environment, a second taxonomy that is related to types of operations performed by the assets, and a third taxonomy that is related to types of measurements being used by the assets.

14. The system of claim 10, wherein the correlating uses a machine learning model trained using historic sensor signals of petroleum service environments to determine correlations between sensors of the petroleum service environments and signals based on features of the signals.

15. The system of claim 10, wherein the automatically deducing further includes:

determining a generic category of the signal by identifying a service provider and a format of the signal based on the transmitter of the signal and the communication protocol of the signal.

16. The system of claim 15, wherein the automatically deducing further includes:

clustering the one or more values of the signal; and detecting and removing outlier values from the signal based on the clustering, wherein the normalizing of the one or more values of the signal is after removing the outlier values.

17. The system of claim 16, wherein the correlating further includes:

comparing the feature of the signal to multiple general signal behaviors;

determining a match of the feature of the signal with at least one of the general signal behaviors;

identifying historic sensor signals that exhibit the at least one of the general signal behaviors; and determining a correlation of the signal with the known sensors using the identified historic sensor signals; and wherein the automatically deducing further includes:

selecting one or more generic taxonomic types of the sensors based on the generic and range-based categories and the sensors;

determining the source of the signal observing the signal over at least one contextual event involving the one or more generic taxonomic types of the sensors; and assigning a unique source identifier, which corresponds to one of available sensors or IoTs in the petroleum service environment, to the signal.

18. The system of claim 10, wherein the operations further include analyzing a performance of one or more assets of the petroleum service environment using the BI data repository, wherein the one or more assets include a top drive, derrick equipment, a mud pump, a lifting system, drill pipe handling equipment, a downhole tool, or a surface motor.

19. A system for automatically deducing a source of signals in a petroleum service environment, comprising:

one or more processors to perform operations that include:

receiving a data stream generated from an unknown source of a petroleum service environment, wherein the data stream is transmitted by a transmitter;

obtaining one or more values of the signal by observing the signal, automatically determining a sampling rate and a value range of the signal from the one or more values, classify the signal within one or more categories according to at least the sampling rate and the value range, normalizing the one or more values of the signal, extracting a feature of the signal by applying a transformation to the normalized one or more values of the signal, correlating the extracted feature with known sources using a trained machine learning model trained using historic sensor signals of petroleum service environments to determine correlations between sensors of the petroleum service environments and signals based on features of the signals, identifying possible sources of the signal from the known sources using previously identified sensor signals, selecting one or more generic taxonomic types of the possible sources using the categories, automatically deducing a source of the signal from the possible sources of the signal by observing the signal over at least one contextual event involving the one or more generic taxonomic types of the possible sources, and controlling one or more assets of the petroleum service environment associated with the source according to an analysis based on the one or more values and the one or more generic taxonomic types.

20. The system as recited in claim 19, wherein the one or more assets is a top drive, derrick equipment, a mud pump, a lifting system, drill pipe handling equipment, a downhole tool, or a surface motor.

* * * * *